United States Patent
Leffler

(10) Patent No.: US 12,272,949 B2
(45) Date of Patent: Apr. 8, 2025

(54) SYSTEMS AND METHODS FOR POWER GENERATION FORECASTING USING TEXT MINING AND FEATURE ENGINEERING

(71) Applicant: Carrier Corporation, Palm Beach Gardens, FL (US)

(72) Inventor: Robert Leffler, Portland, ME (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 341 days.

(21) Appl. No.: 17/811,991

(22) Filed: Jul. 12, 2022

(65) Prior Publication Data
US 2023/0032443 A1 Feb. 2, 2023

Related U.S. Application Data

(60) Provisional application No. 63/203,526, filed on Jul. 27, 2021.

(51) Int. Cl.
 *H02J 3/00* (2006.01)
 *G01W 1/10* (2006.01)
 *H02J 3/14* (2006.01)

(52) U.S. Cl.
 CPC .............. *H02J 3/004* (2020.01); *G01W 1/10* (2013.01); *H02J 3/144* (2020.01)

(58) Field of Classification Search
 CPC ........ H02J 3/004; H02J 3/144; H02J 2203/20; H02J 3/381; H02J 2310/10; G01W 1/10; G06Q 50/06; G06Q 10/04
 See application file for complete search history.

(56) References Cited

U.S. PATENT DOCUMENTS 11,532,943 B1 * 12/2022 Zauli ....................... H02J 3/003
2014/0129040 A1 5/2014 Emadi et al.
(Continued)

FOREIGN PATENT DOCUMENTS

CN 110019595 A 7/2019
JP 2017200360 A * 11/2017
(Continued)

OTHER PUBLICATIONS

Pawluk, Robert E., Yuxiang Chen, and Yuntong She. "Photovoltaic electricity generation loss due to snow—A literature review on influence factors, estimation, and mitigation." Renewable and Sustainable Energy Reviews 107 (2019): 171-182. (Year: 2019).*

*Primary Examiner* — Mohammad Ali
*Assistant Examiner* — Dhruvkumar Patel
(74) *Attorney, Agent, or Firm* — Drew Folgmann

(57) ABSTRACT

Systems and methods for power generation forecasting in a microgrid are disclosed. In some embodiments, a system comprises at least one processor; and memory storing instructions executable by the at least one processor, the instructions when executed cause the system to: obtain weather information; extract, from the weather information, one or more weather events, the one or more weather events including a first event, wherein the first event causes reduction of power generation of a power generation system; determine a condition of one or more components of the power generation system based on the first weather event; and determine future power generation by the power generation system based on the determined condition of the power generation system.

18 Claims, 9 Drawing Sheets

(56) References Cited

U.S. PATENT DOCUMENTS

| | | | |
|---|---|---|---|
| 2017/0286882 A1* | 10/2017 | Fife | G01R 31/392 |
| 2018/0275314 A1* | 9/2018 | Pavlovski | G01W 1/12 |
| 2019/0006850 A1 | 1/2019 | Bistoni et al. | |
| 2020/0194603 A1* | 6/2020 | Youn | H01L 31/048 |
| 2021/0408967 A1* | 12/2021 | Anderegg | G01R 31/00 |

FOREIGN PATENT DOCUMENTS

| | | | | |
|---|---|---|---|---|
| KR | 2015145075 A | * | 12/2015 | |
| KR | 2022105823 A | * | 7/2022 | H02S 40/32 |
| WO | 2015073997 A2 | | 5/2015 | |

\* cited by examiner

SYSTEMS AND METHODS FOR POWER GENERATION FORECASTING USING TEXT MINING AND FEATURE ENGINEERING

CROSS REFERENCE TO A RELATED APPLICATION

The application claims the benefit of U.S. Provisional Application No. 63/203,526 filed Jul. 27, 2021, the contents of which are hereby incorporated in their entirety.

BACKGROUND

The invention relates generally to power generation forecasting and, more specifically, to power generation forecasting in a microgrid using text mining and feature engineering.

Power generation forecast models are used to predict power generation, for example in microgrids on smart homes, to plan and optimize power source allocation. In some cases, these models use weather information to predict power generation. However, these models may be inaccurate in some cases.

BRIEF DESCRIPTION

Aspects of the disclosure relate to methods, apparatuses, and/or systems for power generation forecasting using text mining and feature engineering.

In some embodiments, a system for power generation forecasting in a microgrid comprises at least one processor; and memory storing instructions executable by the at least one processor, the instructions when executed cause the system to obtain weather information; extract, from the weather information, one or more weather events, the one or more weather events including a first event, wherein the first event causes reduction of power generation of a power generation system; determine a condition of one or more components of the power generation system based on the first weather event; and determine future power generation by the power generation system based on the determined condition of the power generation system.

In some embodiments, the instructions further cause the system to extract a second weather event, wherein responsive to a parameter for the second weather event reaching a predetermined value, the first event does not cause reduction of power generation; determine a future condition of the one or more components of the power generation system based on the first and second weather events; and update the determined future power generation based on the future condition.

In some embodiments, the one or more weather events are determined using text mining of the weather information.

In some embodiments, the determined condition indicates whether the one or more components are obstructed. In some embodiments, the instructions may cause the system to generate a control signal to remove the obstruction, responsive to a determination that the one or more components are obstructed.

In some embodiments, the instructions may cause the system to generate a recommendation to remove the obstruction responsive to a determination that the one or more components are obstructed; and display the recommendation on a user interface.

In some embodiments, the instructions may cause the system to send a control signal to the microgrid to maximize energy storage responsive to detecting an extreme weather event from the one or more extracted weather events.

In some embodiments, the instructions may cause the system to send a control signal to the microgrid to minimize energy cost responsive to an absence of extreme weather events in the one or more extracted weather events.

In some embodiments, the power generation system comprises a photovoltaic power generation system, and wherein the one or more components include a solar panel.

In some embodiments, a method for power generation forecasting in a microgrid, the method being implemented in system comprising at least one processor, and memory storing instructions. The method comprises: obtaining weather information; extracting, from the weather information, one or more weather events, the one or more weather events including a first event, wherein the first event causes reduction of power generation of a power generation system; determining a condition of one or more components of the power generation system based on the first weather event; and determining future power generation by the power generation system based on the determined condition of the power generation system.

In some embodiments, a non-transitory computer-readable storage medium storing program instructions computer-executable to implement: obtaining weather information; extracting, from the weather information, one or more weather events, the one or more weather events including a first event, wherein the first event causes reduction of power generation of a power generation system; determining a condition of one or more components of the power generation system based on the first weather event; and determining future power generation by the power generation system based on the determined condition of the power generation system.

Various other aspects, features, and advantages of the invention will be apparent through the detailed description of the invention and the drawings attached hereto. It is also to be understood that both the foregoing general description and the following detailed description are examples and not restrictive of the scope of the invention.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

FIG. 1-A illustrates an example of a plot for power generation and weather conditions using traditional models.

DETAILED DESCRIPTION

Figure 1:
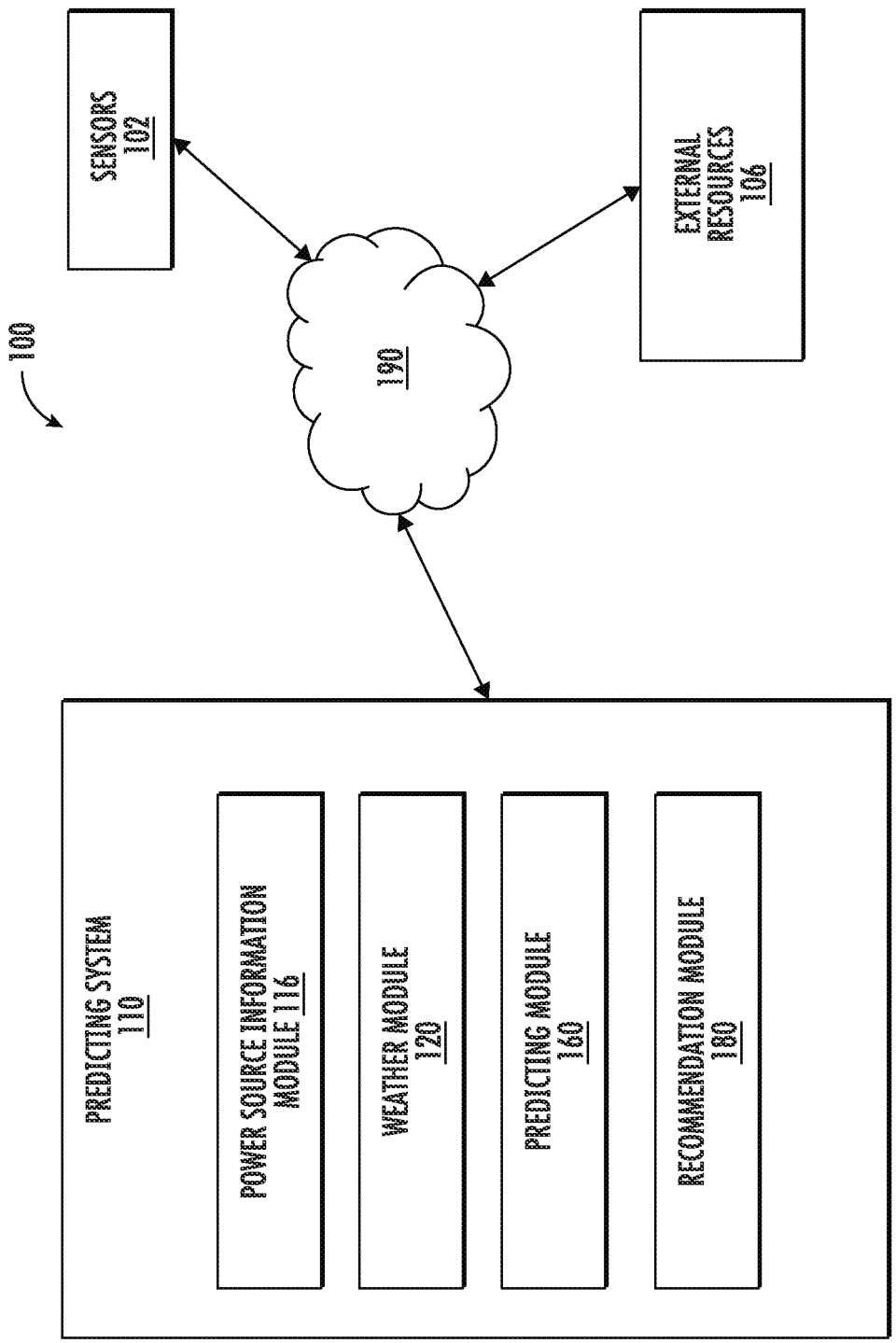
FIG. 1 illustrates an example of a system for power generation forecasting, in accordance with one or more embodiments.
Figure 1A:
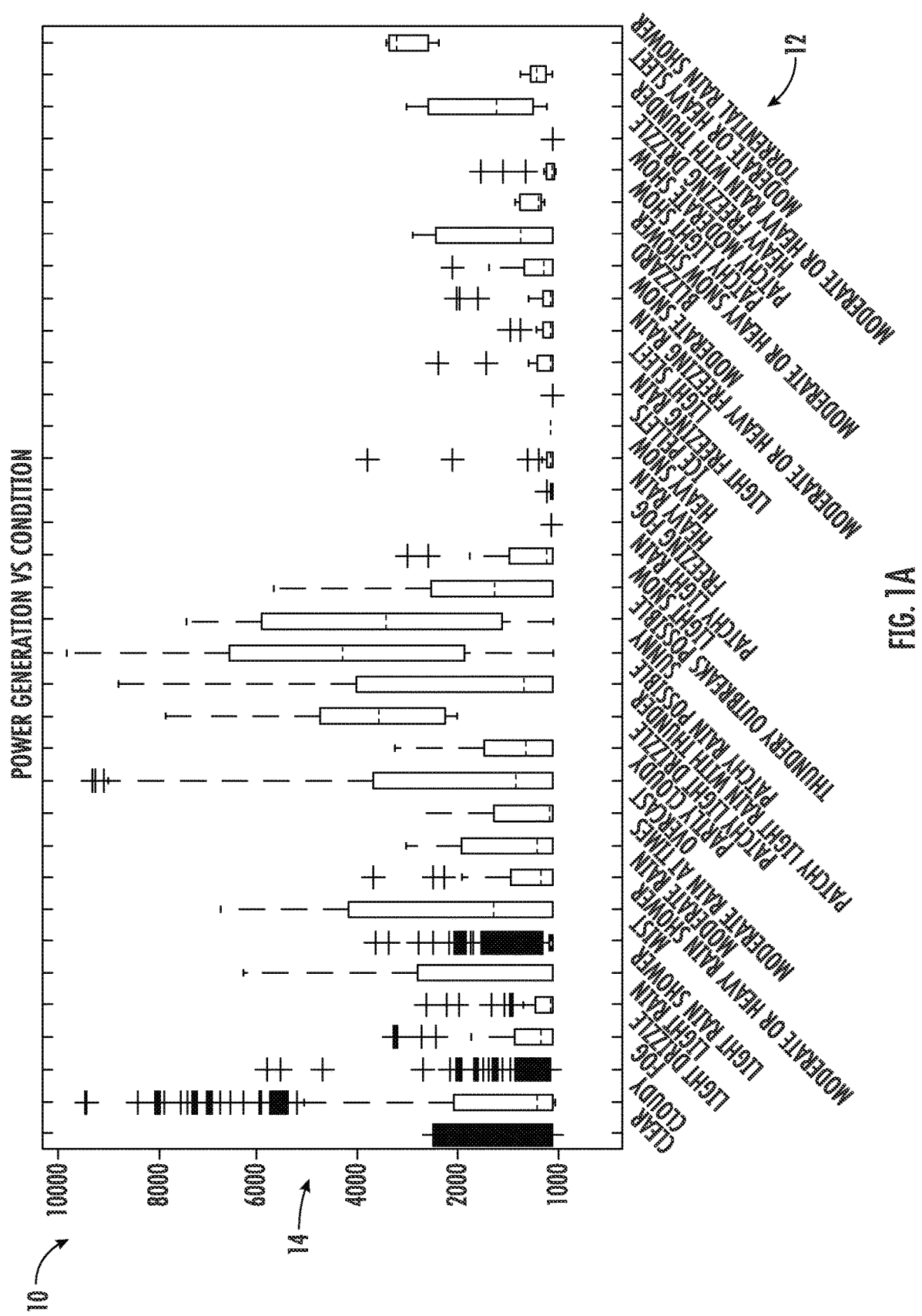

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

In some embodiments, a system 100 for power generation forecasting may be configured to determine (or predict) power generation by a power generation system. In some embodiments, system 100 may use data extraction techniques or feature engineering to determine weather events. In some embodiments, system 100 may be configured to determine a condition of the power generation system based on the weather events (e.g., a condition of a component of the power generation system that may be affected by different weather events). In some embodiments, power generation forecasting models may use the condition of the power generation system to determine (or predict) power generation. Traditional forecasting models for renewable energy generation systems generally use weather information to predict power generation and determine power source allocation. For example, for photovoltaic power generation, forecast models use solar insolation forecasts to predict power generation. However, these forecast models may fail because of weather events (e.g., because of snow, wind, storm, etc.) that may cause the panels to be obstructed (e.g., panel covered). For example, FIG. 1-A shows an example of a plot box 10 for power generation vs weather conditions that uses traditional forecasting models. As can be seen form plot 10, there is a large number of categorical variables (weather conditions). The plot shows that weather descriptions 12 correlate with solar power generation 14. For example, some weather conditions have higher correlation with power generation than others. However, there are too many unique weather descriptions to provide a reliable power generation forecast.

The present disclosure describes a system 100 that, in some embodiments, may use text mining and feature engineering to determine one or more weather event parameters. The weather events and event parameters may be current, past, or future weather events. For example, in some embodiments, system 100 may be configured to determine weather events (and event parameters) that may affect energy generation even when the weather event is not present anymore (past event). For example, system 100 may be configured to determine weather events that may cause one or more components of the energy generation source to be obstructed, which may affect energy generation. In some embodiments, system 100 may be configured to apply a machine learning model to categorize the weather events based on similarities in event parameters. For example, the weather event parameters may be categorized into weather type (e.g., snow, rain, wind, etc.) or intensity (e.g., light, moderate, heavy, etc.). In some embodiments, the weather event parameters may be used in the forecast models for the energy generation system. Accordingly, the present methods may improve the forecasting models since they take into consideration when the energy generation system (or one of its component) is obstructed and does not generate energy as expected. Additionally, these forecasting models may provide better information to microgrid source selection optimization algorithms (e.g., in smart buildings), which may lead to smarter energy source recommendations and lower grid power use over time. That said, not all embodiments necessarily provide all of these benefits, and some embodiments may provide other distinct advantages, which is not to suggest that any other feature described herein may not also be omitted in some embodiments.

FIG. 1 shows a system 100 for power generation forecasting, in accordance with one or more embodiments. In some embodiments, system 100 may include a prediction system 110, sensors 102, external resources 106, and/or other components. Other components known to one of ordinary skill in the art may be included in system 100 to gather, process, transmit, receive, acquire, and provide information used in conjunction with the disclosed embodiments. In addition, system 100 may further include other components that perform or assist in the performance of one or more processes that are consistent with disclosed embodiments.

In some embodiments, sensors 102 may be configured to generate output signals related to one or more environmental parameters at or around the energy generation system. In some embodiments, the environmental parameters may include one or more of temperature, humidity, pressure, weather conditions, or other environmental parameters. Sensors 102 may be disposed in a plurality of location within or outside system 100. For example, in some embodiments, sensors 102 may comprise one or more sensors that measure such parameters directly (e.g., through fluid communication with the energy generation system.) In some embodiments, sensors 102 may comprise one or more sensors that generate output signals related to the one or more parameters indirectly (e.g., through measurements from other sensors or other components within or outside system 100). In some embodiments, sensors 102 may include temperature sensors, humidity sensors, pressure sensors, wind speed sensor, rain sensor, snow sensor, or other environmental or weather-related sensors. For example, in the case of a PV system, in some embodiments, one or more sensors may be configured to measure temperature of the solar panels. In some embodiments, one or more sensors may be configured to measure the environmental parameters surrounding the solar panels (e.g., outside temperature, pressure, humidity, or other outside parameters). In some embodiments, one or more sensors may be optical, audio, thermal sensors, or other sensors configured to generate output signals related to a condition of the power generation system, or to weather at the power generation system.

In some embodiments, prediction system 110 may include a power source information module 116, a weather information module 120, a prediction module 160, a recommendation module 180, and/or other components. In some embodiments, prediction system 110 may include computing resources such as processors and memory devices for storing instructions (e.g., computing system 800 described herein below with reference to FIG. 8). The processors may be configured to execute software instructions to perform various operations of system 100. The computing resources may include software instructions to perform operations of modules 110, 116, 120, 160, 180, and/or other components of system 100.

Power source information module 116 may be configured to obtain information related to the power generation system. In some embodiments, power source information module 116 may be configured to determine one or more of the power generation type (e.g., solar, wind, grid, battery, etc.), the make, model, load capacity, power characteristics, a state (e.g., on/off), and/or other information related to the power generation system. In some embodiments, power source information module 116 may be configured to obtain this information from one or more sensors 102, external resources 106, user input via a user interface (e.g., interface 850 described herein), or from other components within or outside of system 100.

Weather information module 120 may be configured to obtain weather information. The weather information may include past, current, or future weather forecast. In some embodiments, the weather information may include text description of weather events. For example, the information may include descriptors such as "rain", "fog", "snow", "sunny", "clear", "cloudy", "overcast", "wind", "storm" or other weather descriptors. In some embodiments, the weather information may be obtained from one or more weather forecast APIs (e.g., in .json format). In some embodiments, the weather information may be obtained from one or more sensors (e.g., sensors 102), external resources 106 user input via a user interface (e.g., interface 850 described herein), or from other components within or outside of system 100.

In some embodiments, prediction module 160 may determine that one or more of the weather events may affect energy generation (e.g., at the time of the event, after the event, or even before the event starts). In some embodiments, the one or more weather events may be extracted from the received weather information using text mining techniques. In some embodiments, the weather events detected in the weather information may not be concurrent, instead the events may be a combination of current past, or future events (e.g., past snow, current sun, and current wind). For example, one or more of the detected weather events, may affect energy generation by causing reduction in power generation or by preventing the energy system from performing as expected (e.g., because of obstruction of a component). In some embodiments, affecting energy generation by the detected weather events includes causing an increase in power generation. In some embodiments, prediction module 160 may rank the detected weather events based on the type of the weather event and their likelihood to influence the energy system performance. For example, prediction module 160 may be configured to give a higher rank to weather events that may affect the power system more than other events. In some embodiments, the prediction module 160 may determine the ranking of the weather events based on the type of the energy generating system. For example, in a photovoltaic power generation system, if snow, sun, and cloud are detected, the prediction module 160 may be configured to rank the events (assign weight) based on the likelihood of each of the events affecting the PV system. In this case, snow may be ranked higher than clouds and sun because snow might affect the solar power generation more than clouds or sun. In other energy generation systems, the ranking of the same weather events (snow, cloud, and sun) may be different. In some embodiments, prediction module 160 may be configured to rank the weather events based on a pre-determined criteria for different weather events. For example, weather events may be ranked based on their intensity and the likelihood of the intensity of that event to affect energy generation. In some embodiments, the prediction module 160 may be configured to assign the ranks based on historical data (e.g., related to past weather events, energy system condition, or energy system performance). In some embodiments, ranking the weather events may be based on user preference or manufacturer.

In some embodiments, prediction module 160 may be configured to determine (or predict) a condition of the energy generation system based on the weather information. The determined condition (caused by the weather event) may indicate whether power generation system may perform as expected. In some embodiments, the condition may indicate that one or more components of the power generation system may be partially operational, not operational, or operational (as a result of a weather event). In some embodiments, examples of conditions may include "covered", "partially covered" "obstructed", "partially obstructed", "clear", "partially clear", or other conditions of the energy generation system. In some embodiments, the condition may be given values that change with change in the condition of the power generation system. For example, the value may change between "0" and "1" based on the condition. In some embodiments, the prediction module 160 may predict a change in the condition based on weather events, time, sensor readings, user input, etc. In some embodiments, the condition or condition values may be used in the energy forecasting models to provide a better prediction of power generation.

It's to be noted that the descriptors of the condition given here (e.g., obstructed, operational, etc.) are for illustration purposes only. Any type of descriptors (e.g., alpha numeric, symbols, etc.) may be used to describe a condition of one or more or more components of the power generation system. The condition or the descriptor of the condition may indicate whether the power generation system may perform as expected. For example, the condition may indicate that the system should perform normally. In some embodiments, system 100 may be configured to display the predicted condition on a user interface, request a confirmation of the condition from the user, recommend a course of action (e.g., check the power generation system, remove the obstruction, or other recommendation). In some embodiments, system 100 may be configured to remove the obstruction (e.g., by sending a control signal to a component within or outside system 100, the component configured to remove the obstruction).

Figure 2:
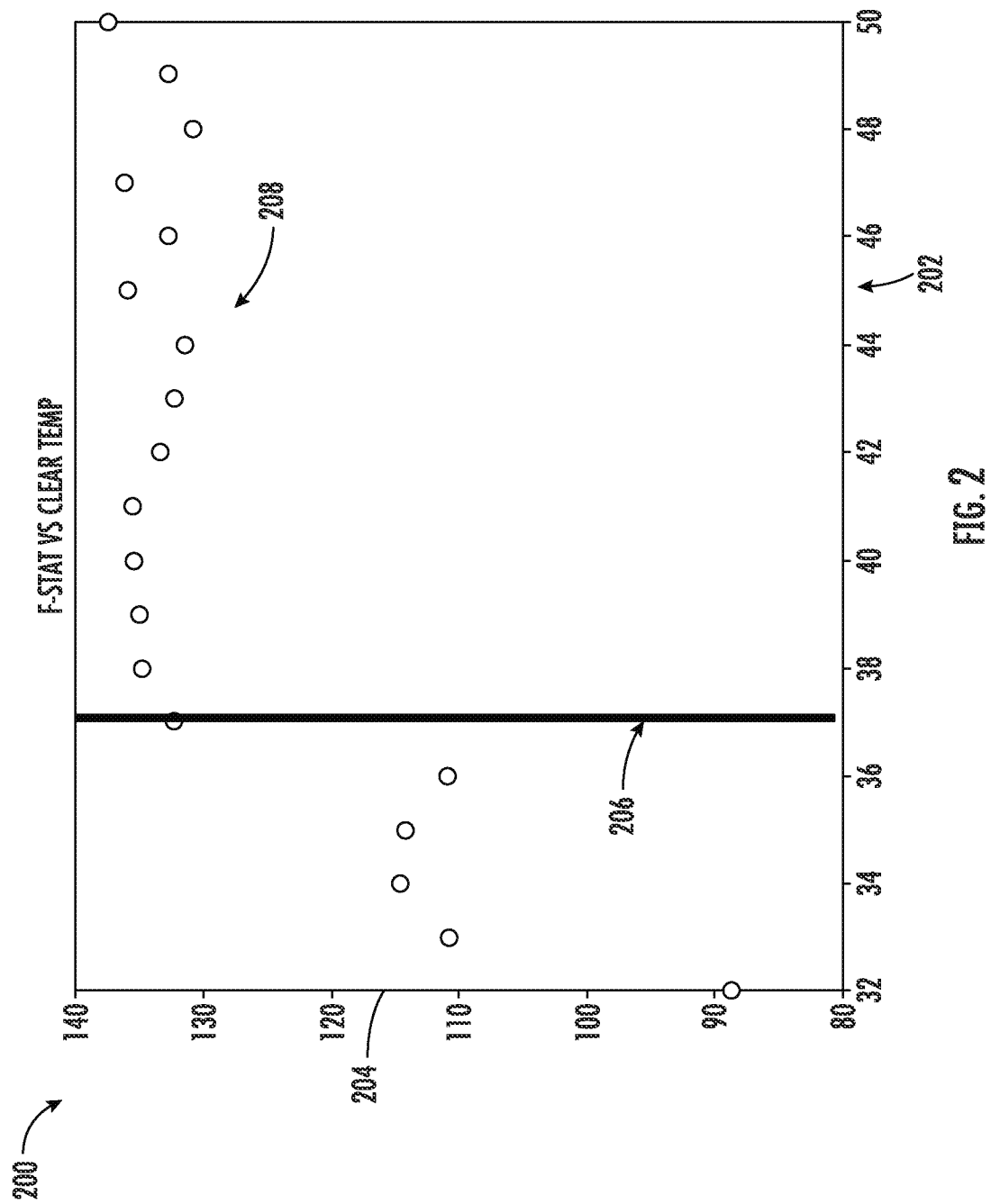
FIG. 2 illustrates an example of a plot for prediction models, in accordance with one or more embodiments.

In some embodiments, prediction module 160 may include one or more prediction models configured to determine (or predict) a condition of the energy system based on the detected weather events. FIG. 2 illustrates an example a plot 200 of F-statistics vs temperature in the case of a PV power generator, in accordance with one or more embodiments. In FIG. 2, the x axis corresponds to temperature 202, the y axis corresponds to F statistics values 204. In this example, ANOVA F tests were used to evaluate different prediction models. For example, if the word "snow" appears in the current weather, a feature (or condition) "covered" turns from 0 to 1 and remains at 1 until the temperature reaches temperature 206, around ~37-40° F. (high enough for snow to melt). As can be seen from the plot, the value of F-Stat reaches a higher value around a temperatures 37-40° F., beyond which the value of F-Stat 208 stabilizes. Accordingly, the feature "covered" may be turned off (changes from 0 to 1) when the temperature reaches around 37-40° F. (i.e., the snow probably melted, the panels are not covered, and the solar power may be generated).

It's to be noted that the example of weather event snow shown in FIG. 2 is for illustration purposes only, other examples of other weather events may cause obstruction of PV systems. For example, wind events (or storms) may cause leaves (or debris) to cover one or more panels, dust storms may cover panels (with dust/dirt), etc. Similarly, in these cases, the prediction module 160 may generate a feature "covered" or "obstructed" that is indicative of the condition of one or more panels. The feature "covered" may turn to "1" in response to detection (via text mining) of wind, storm, dust, or other events. Prediction module 160 may change the feature to "0" based on change in weather events, time, sensor readings, or user input. In some embodiments, the same may apply to other power generation systems that may be affected by weather events.

Figure 3:
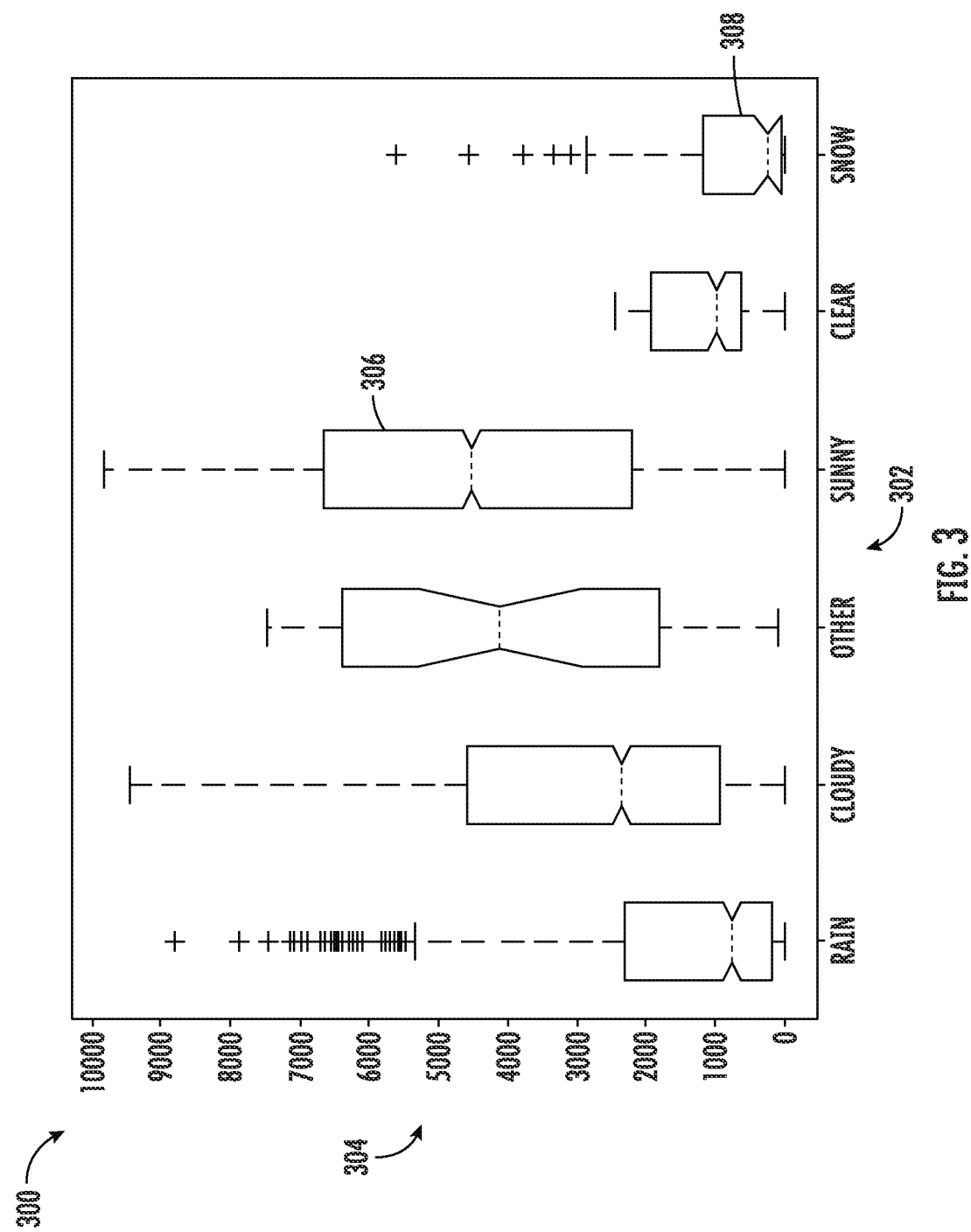
FIG. 3 illustrates an example of a plot for power generation and type of weather condition, in accordance with one or more embodiments.

In some embodiments, prediction module 160 may be configured to categorize the weather events (e.g., using machine learning models) based on similarities in event parameters. For example, the weather event parameters may be categorized into weather type (e.g., snow, rain, wind, etc.) or intensity (e.g., light, moderate, heavy, etc.). For example, a first cluster (or category) may be related to rain events. In some embodiments, the first category may include "rain", "drizzle", "shower", or other rain related weather events. Similarly, a second cluster may be related to snow events and may include snow, "sleet", "ice", "blizzard", or other snow events. A third cluster may include cloudy weather events, and may include "cloud", "cloudy", "clouds", "overcast" or other cloud events. The same may be applied to other weather events extracted from the weather information obtained by weather information module 120. In some embodiments, categorizing the weather events based on type may provide energy forecasting models a more manageable set of data that may provide a better prediction of power generation. FIG. 3 illustrates an ANOVA box plot 300 for power generation vs the type of weather condition, in accordance with one or more embodiments. As can be seen, clustering based on the type of weather 302 provides for a smaller number of categories with notable differences in solar power generation 304. For example, events categorized as "sunny" 306 correspond to higher power generation, and events that are categorized as "snow" 308 correspond to lower power generation.

Figure 4:
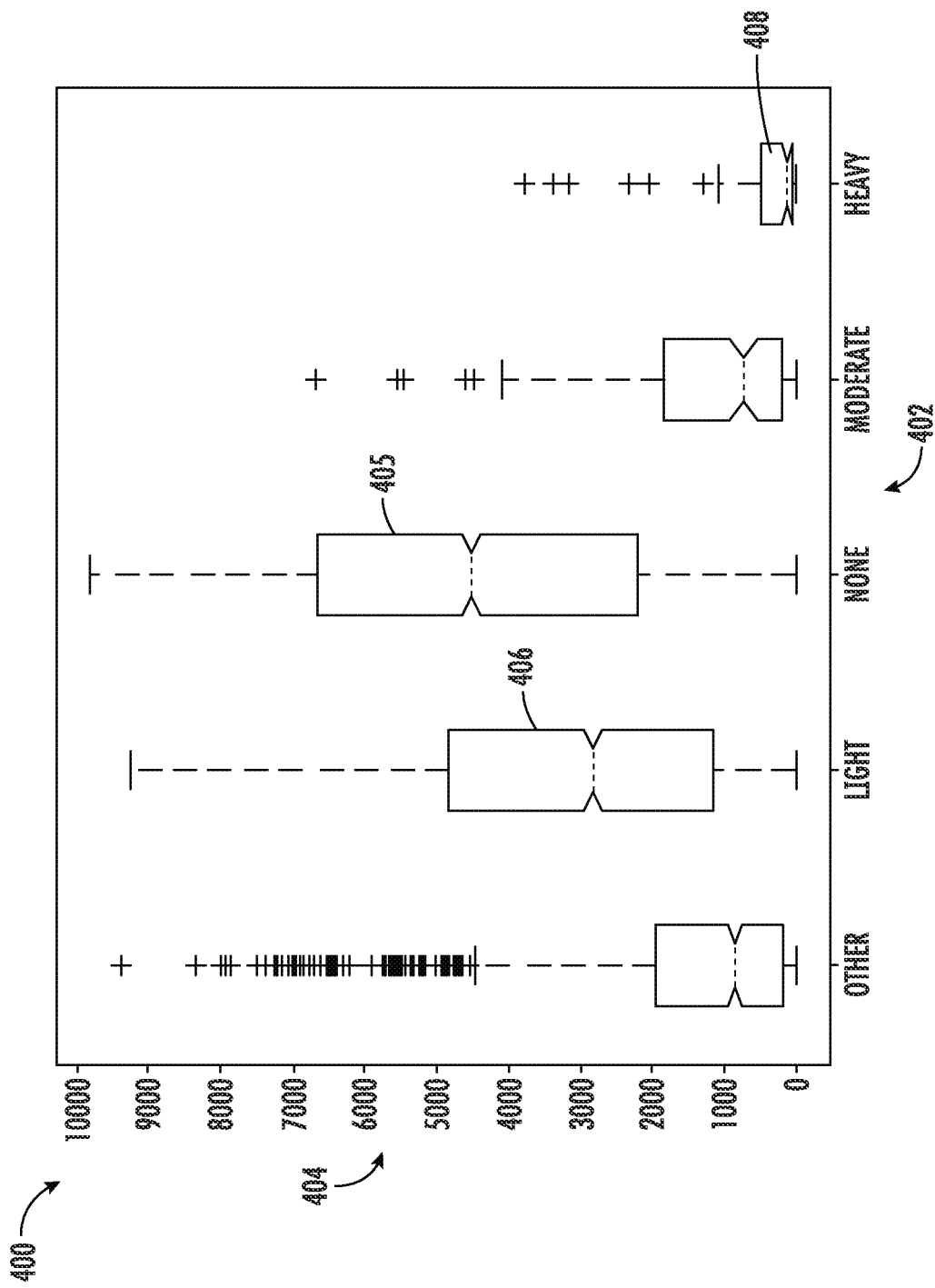
FIG. 4 illustrates an example of a plot for power generation and intensity of weather condition, in accordance with one or more embodiments.

In some embodiments, prediction module 160 may be configured to cluster (categorize) the extracted weather information (e.g., weather events) based on intensity of the weather events. For example, a first cluster (or category) may be related to weather events having a light intensity. In some embodiments, the first category may include "light", "patchy", "isolated", "scattered", "possible", or other light related weather events. Similarly, a second cluster may be related to heavy weather events and may include snow, "torrential", "blizzard", "extreme", or other heavy weather events. The same may be applied to other intensity of weather events extracted from the weather information obtained by system 100 (e.g., moderate, etc.). In some embodiments, categorizing the weather events based on intensity may provide energy forecasting models a more manageable set of data that may provide a better prediction of power generation. FIG. 4 illustrates a ANOVA box plot 400 for power generation vs the intensity of weather condition, in accordance with one or more embodiments. As can be seen, clustering based on the intensity of weather events 402 provides for a smaller number of categories with notable differences in solar power generation 404. For example, Events categorized as "none" 405 or "light" 406 correspond to higher power generation, and events that are categorized as "heavy" 408 correspond to lower power generation.

In some embodiments, recommendation module 180 may be configured to generate one or more recommendation based on obtained condition of power generation system, weather events, or weather event categorization. For example, in some embodiments, recommendation module 180 may generate a recommendation to remove an obstruction to the one or more components of the power generation system. The recommendation may be displayed on a user interface (e.g., interface 850 described herein). A user may accept/deny the recommendation. For example, in the case of a covered solar panel, recommendation module 180 may recommend clearing the solar panel. In some embodiments, recommendation module 180 may generate a control signal to remove the obstruction (e.g., the control signal activates one or more components within or outside system 100 to remove the obstruction). For example, recommendation module 180 may send a control signal (or command) to activate a solar panel heater to melt snow covering the panel.

Figure 5:
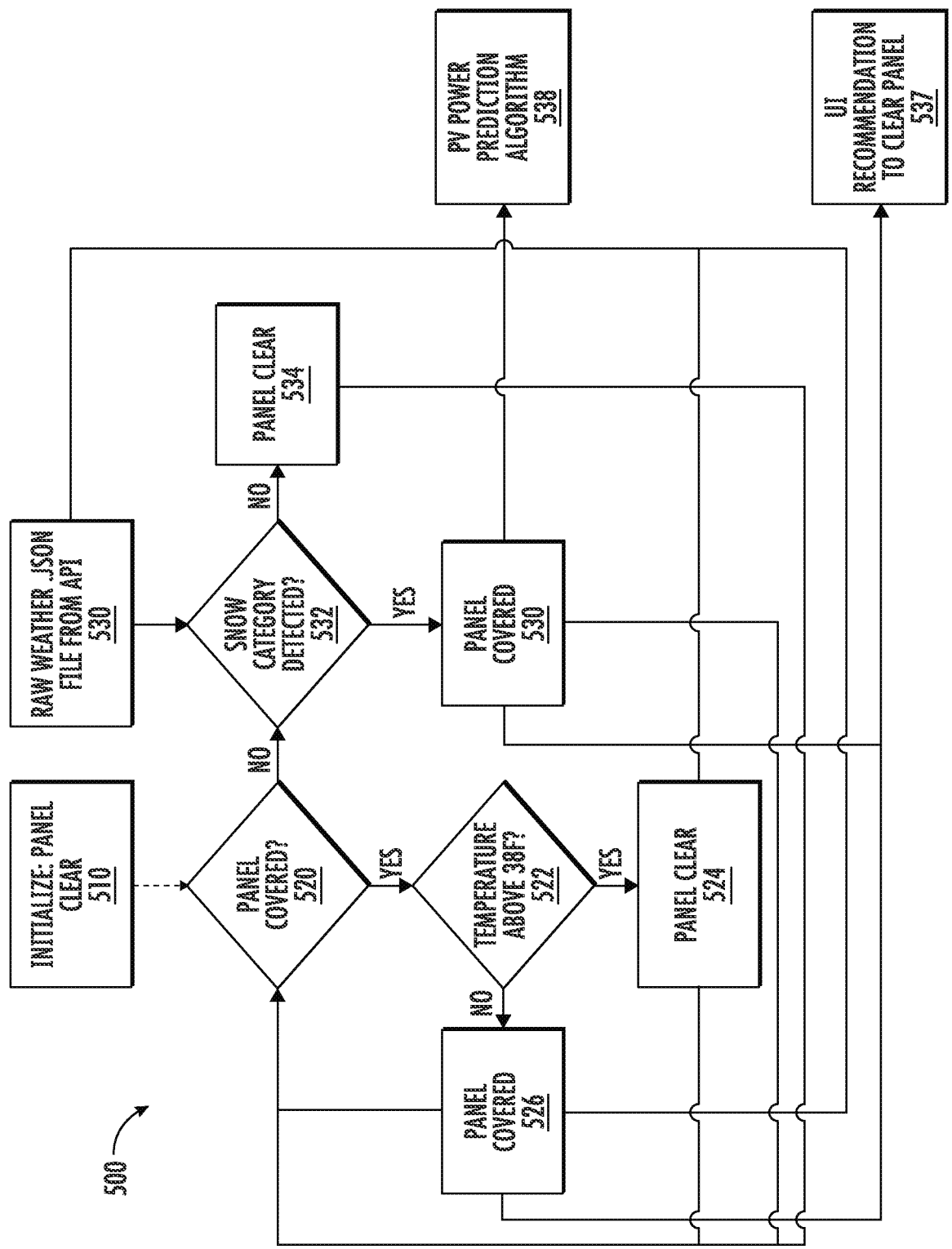
FIG. 5 illustrates an example of operation of a system for power generation forecasting, in accordance with one or more embodiments.

In some embodiments, prediction module 160 may be configured to determine (or predict) future power generation based on the determined condition of the power generation system (the condition of the power generation system being determined based on the weather events). In some embodiments, prediction module 160 may be configured to update the determined future power generation determination (or prediction) based on changes in weather information. For example, if a future power determination is made based on a first weather event (e.g., the first weather event causes reduction of power generation), the future power generation determination may be updated responsive to extracting a second weather (e.g., responsive to a parameter for the second weather event reaching a predetermined value, the first event does not cause reduction of power generation). FIG. 5 illustrates a flow chart 500 of an example of operation of the present system, in accordance with one or more embodiments. Flow chart 500 shows an example for using text mining to determine if the solar panels are covered with snow. For example, after an optional initialization step 510 where the panel is set to be clear, at step 520 the system determines if the panel is covered. If yes, the system moves to step 522 to determine if the temperature outside is above 38° F. If yes, the system determines that the panel is clear at step 524. The system moves back to step 520 to determine if the panel is covered. If the temperature is not above 38° F., the system determines that the panel is covered at 526. In the example, responsive to determining that the panel is covered, the recommendation module may generate a recommendation to clear the panel. A user interface may display the recommendation for the user.

If the panel is not covered at 520, the system determines whether a snow category is detected at 532. In this example, the system uses raw weather data in a .json format 530 obtained from a weather API. If no snow category is detected, the system determines that the panel is clear at 534, after which the system goes back to step 520 to check if the panel is covered. If a snow category is detected at 532, the system determines the panel is covered, the system determines that the panel is covered at 536. In the example, responsive to determining that the panel is covered, the recommendation module may generate a recommendation 537 to clear the panel. A user interface may display the recommendation for the user. Additionally, the weather information 530, and the determined panel condition (e.g., determination that the panel is clear at 524 and 534, and the determination that the panel is covered at 526 and 536) may be used in the power generation prediction model 538 to help provide a more accurate prediction about the power generation.

Figure 6:
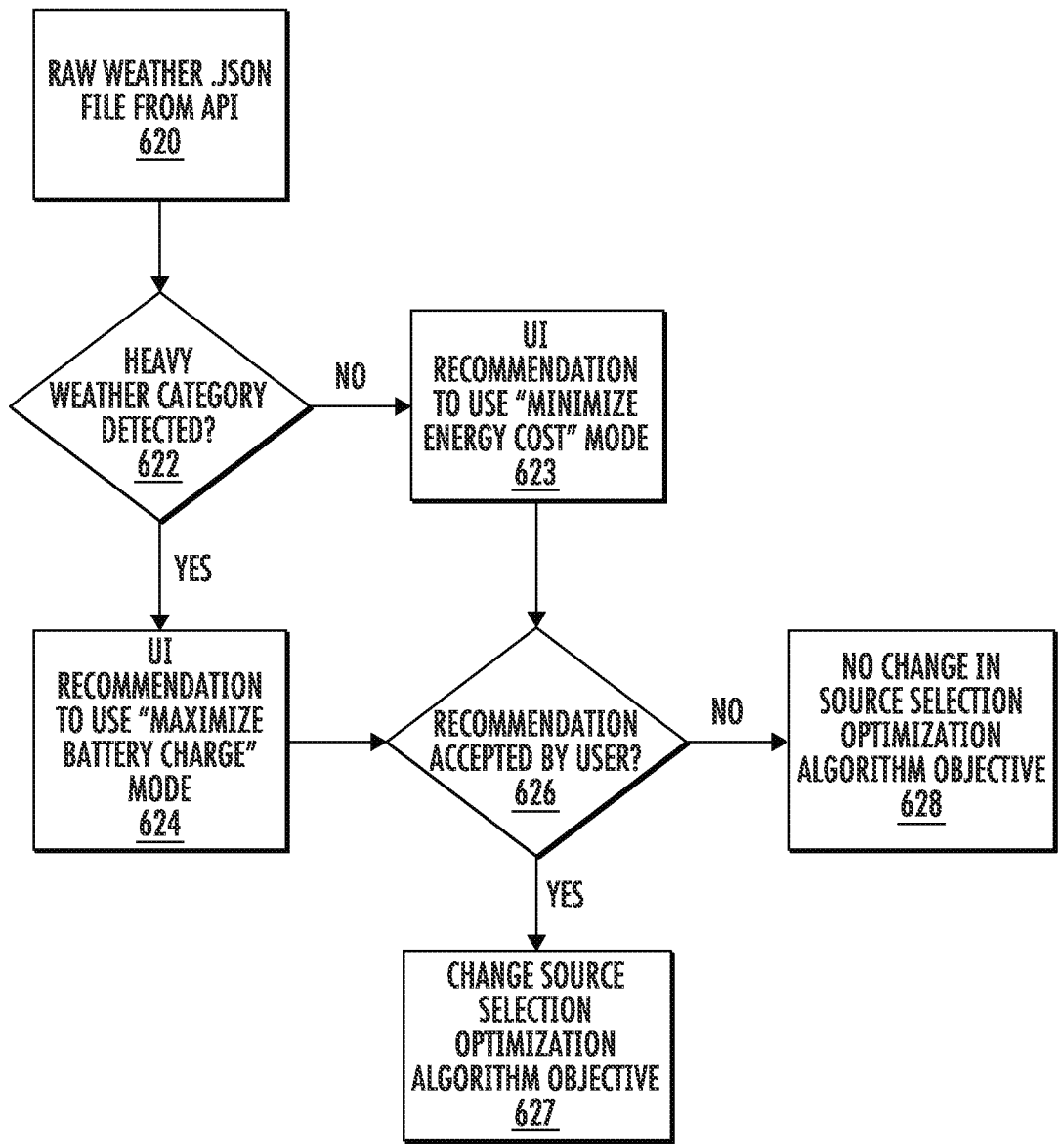
FIG. 6 illustrates an example of operation of a system for power generation forecasting, in accordance with one or more embodiments.

In some embodiments, recommendation module 180 may be configured to generate recommendation about power source management and optimization based on the obtained weather event (or event categorization), energy generation system condition, or other obtained information. FIG. 6 illustrates a flow chart 600 of an example of operation of the present system, in accordance with one or more embodiments. Flow chart 600 shows an example for using text mining to determine if the smart building should prepare for a power outage and maximize battery charge. For example, at step 620 raw weather information (e.g., in .json file format) is obtained from a weather API. At step 622 the system determines whether a heavy weather category is detected. If yes, at 624, the system may recommend "maximize Battery charge" mode. At step 626, the system determines whether the user accepted the recommendation. If yes, at step 627 the system may change the source selection optimization model objective (to maximizing battery charge). If the user did not accept the recommendation, at step 628, the system does not change the source selection optimization model objective. If no heavy weather category is detected, the system may recommend "minimize energy cost" mode at step 623, after which the system moves to step 624, and 626 or 628 described herein.

Returning to FIG. 1, External resources 106 may include sources of information outside of system 100, external entities participating with system 100, and/or other resources. For example, in some implementations, external resources 106 may include weather information sources. In some implementations, some or all of the functionality attributed herein to external resources 106 may be provided by resources included in system 100.

In some embodiments, one or more components of system 100 may communicate directly through one or more dedicated communication links. In some embodiments system 100 may include a network 190 connecting one or more components of system 100. In some embodiments, network 190 may be any type of network configured to provide communications between components of system 100. For example, network may be any type of wired or wireless network (including infrastructure) that provides communications, exchanges information, and/or facilitates the exchange of information, such as the Internet, near field communication (NFC), optical code scanner, cellular network, a public switched telephone network ("PSTN"), text messaging systems (e.g., SMS, MMS), frequency (RF) link, Bluetooth®, Wi-Fi, a private data network, a virtual private network, a Wi-Fi network, a LAN or WAN network, or other suitable connections that enables the sending and receiving of information between the components of system 100. It will be appreciated that this is not intended to be limiting and that the scope of this disclosure includes implementations in which the client one or more components of system 100 are operatively linked via some other communication media.

It should be appreciated that the illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium.

Figure 7:
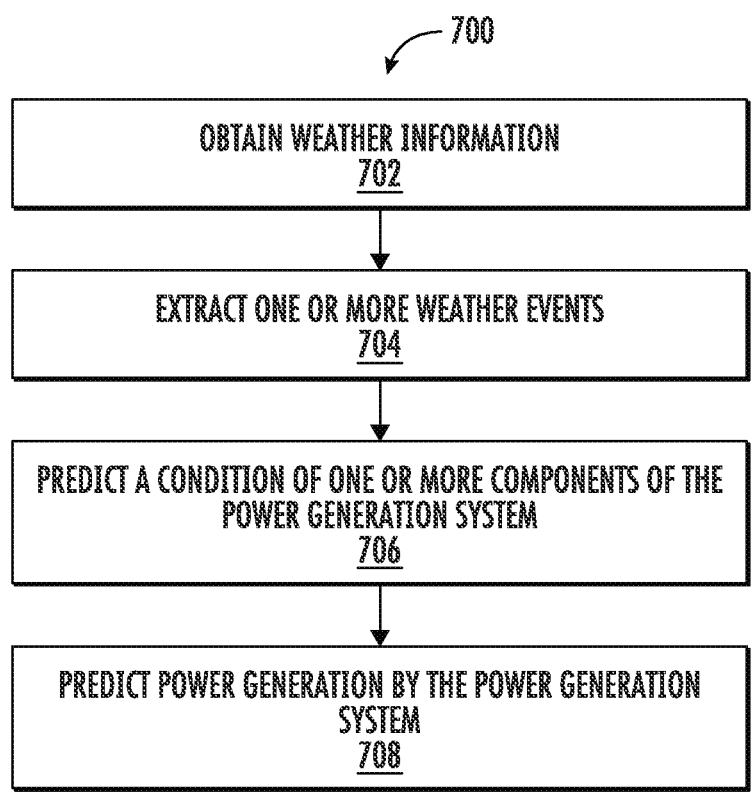
FIG. 7 illustrates a chart of a method for power generation forecasting, in accordance with one or more embodiments.

FIG. 7 Illustrates a method 700 for power generation forecasting, in accordance with one or more embodiments of the present disclosure. The operations of method 700 presented below are intended to be illustrative. In some implementations, method 700 may be accomplished with one or more additional operations not described and/or without one or more of the operations discussed. Additionally, the order in which the operations of method 700 are illustrated in FIG. 7 and described below is not intended to be limiting In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

At an operation 702 of method 700, weather information may be obtained. In some embodiments, operation 702 may be performed by a weather information module the same as or similar to weather information module 120 (shown in FIG. 1 and described herein).

At an operation 704 of method 700, one or more weather events may be extracted from the weather information. In some embodiments, the one or more weather events may include a first event. In some embodiments, the first event may cause reduction of power generation of a power generation system. In some embodiments, operation 704 may be performed by a prediction module the same as or similar to prediction module 160 (shown in FIG. 1 and described herein).

At an operation 706 of method 700, a condition of one or more components of the power generation system may be determined based on the first weather event. In some embodiments, operation 706 may be performed by prediction module the same as or similar to prediction module 160 (shown in FIG. 1 and described herein).

At an operation 708 of method 700, future power generation by the power generation system may be determined based on the predicted condition of the power generation system. In some embodiments, operation 706 may be performed by a prediction module the same as or similar to prediction module 160 (shown in FIG. 1 and described herein).

Figure 8:
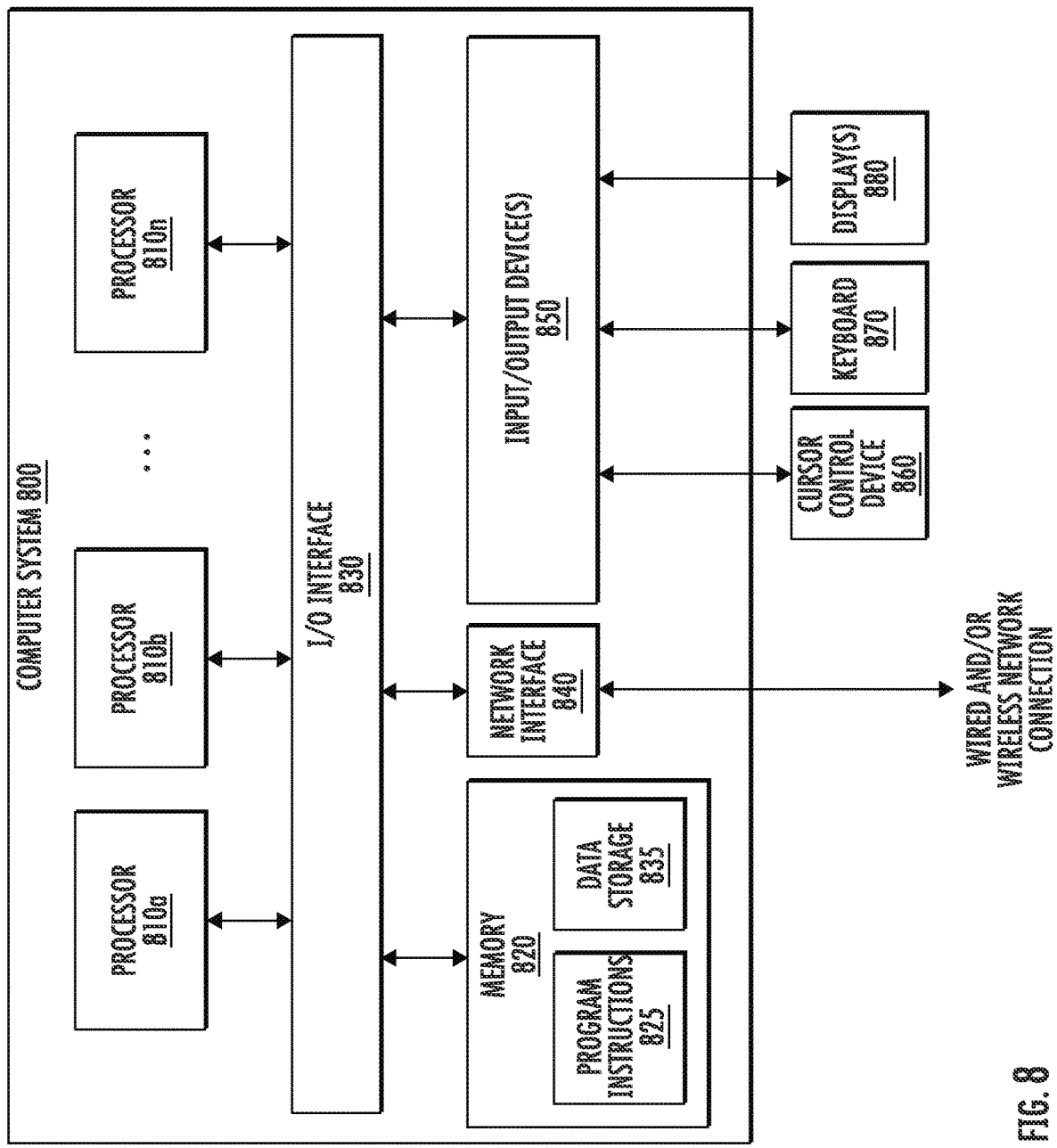
FIG. 8 illustrates an example of a computer system that may be used to implement aspects of the techniques described herein.

Embodiments of one or more techniques of the present disclosure as described herein may be executed on one or more computer systems, which may interact with various other devices. One such computer system 800 is illustrated by FIG. 8. FIG. 8 shows an example of a computer system that may be used to implement aspects of the techniques described herein. In different embodiments, computer system 800 may include any combination of hardware or software that can perform the indicated functions, including, but not limited to, a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or other type of computing or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. may be comprised of semiconductor(s) and/or transistors (e.g., electronic integrated circuits (ICs)). In such a context, processor-executable instructions may be electronically executable instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others. In some embodiments, one or more computers may include multiple processors operating in parallel. A processor may be a central processing unit (CPU) or a special-purpose computing device, such as graphical processing unit (GPU), an integrated circuit or on-chip system, an application-specific integrated circuit (ASIC), a field-programmable gate array (FPGA), a complex programmable logic device (CPLD), or application-specific integrated circuits.

System memory 820 may be configured to store program instructions and/or data accessible by processor 810. In various embodiments, system memory 820 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described in this disclosure, are shown stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840.

In one embodiment, I/O interface 830 may be configured to coordinate I/O traffic between processor 810, system memory 820, and any peripheral devices in the system, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example, via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, cursor control devices (e.g., mouse), keyboards, keypads, touchpads, touchscreens, scanning devices, voice or optical recognition devices, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Those skilled in the art will appreciate that computer system 800 is merely illustrative and is not intended to limit the scope of the present disclosure. In particular, computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A system for power generation forecasting in a microgrid, the system comprising:
   at least one processor;
   a controller configured to send a control signal to a component outside of the system; and
   memory storing instructions executable by the at least one processor, the instructions when executed cause the system to:
   obtain weather information comprising a text description of weather events;
   extract, from the obtained weather information, at least a text description of a first weather event and a text description of a second weather event;
   generate, via a prediction module, one or more features indicative of a condition of one or more components of the power generation system based on the text description of the first weather event;
   update, via the prediction module, the one or more features based on the text description of the second weather event or one or more parameters; and
   determine, via the prediction module, future power generation by the power generation system based on the updated one or more features.

2. The system of claim 1, wherein the one or more parameters comprise time, a sensor reading, or user input.

3. The system of claim 1, wherein updating the one or more features comprises changing a value of the prediction module based on the one or more features.

4. The system of claim 1, wherein the one or more features indicate whether the one or more components are obstructed.

5. The system of claim 4, wherein the instructions further cause the system to:
   generate the control signal to remove the obstruction, responsive to a determination that the one or more components are obstructed.

6. The system of claim 4, wherein the instructions further cause the system to:
   generate a recommendation to remove the obstruction responsive to a determination that the one or more components are obstructed; and
   display the recommendation on a user interface.

7. The system of claim 1, wherein the instructions further cause the system to:
   send the control signal to the microgrid for energy storage, responsive to detecting a presence of the first weather event.

8. The system of claim 1, wherein the instructions further cause the system to:
   send the control signal to the microgrid to reduce energy cost, responsive to an absence of the first weather event.

9. The system of claim 1, wherein the power generation system comprises a photovoltaic power generation system, and wherein the one or more components include a solar panel.

10. A method for power generation forecasting in a microgrid, the method being implemented in a system comprising at least one processor, a controller configured to send a control signal to a component outside of the system, and memory storing instructions, the method comprising:

obtaining weather information comprising a text description of weather events;

extracting, from the obtained weather information, at least a text description of a first weather event and a text description of a second weather event;

generating, via a prediction module, one or more features indicative of a condition of one or more components of the power generation system based on the text description of the first weather event;

updating, via the prediction module, the one or more features based on the text description of the second weather event or one or more parameters; and determining, via the prediction module, future power generation by the power generation system based on the updated one or more features.

11. The method of claim 10, wherein the one or more parameters comprise time, a sensor reading, or user input.

12. The method of claim 10, wherein updating the one or more features comprises changing a value of the prediction module based on the one or more features.

13. The method of claim 10, wherein the one or more features indicate whether the one or more components are obstructed.

14. The method of claim 13, further comprising:
generating the control signal to remove the obstruction, responsive to a determination that the one or more components are obstructed.

15. The method of claim 13, further comprising:
generating a recommendation to remove the obstruction responsive to a determination that the one or more components are obstructed; and
displaying the recommendation on a user interface.

16. The method of claim 10, further comprising:
sending the control signal to the microgrid for energy storage, responsive to detecting the first weather event.

17. The method of claim 10, further comprising:
sending the control signal to the microgrid to reduce energy cost, responsive to an absence of the first weather event.

18. The method of claim 10, wherein the power generation system comprises a photovoltaic power generation system, and wherein the one or more components include a solar panel.

* * * * *